United States Patent [19]

Simmons

[11] Patent Number: 4,583,405
[45] Date of Patent: Apr. 22, 1986

[54] TESTING DEVICE

[76] Inventor: Levy M. Simmons, Rte. 1, Box 175, Ashe, N.C. 28420

[21] Appl. No.: 616,656

[22] Filed: Jun. 4, 1984

[51] Int. Cl.$^4$ .............................................. G01H 11/06
[52] U.S. Cl. ........................................ 73/584; 73/661; 181/125
[58] Field of Search ............ 73/587, 591, 661, 40.5 A, 73/592, 584; 181/125; 310/336; 445/3, 63

[56] References Cited

U.S. PATENT DOCUMENTS

| | | | |
|---|---|---|---|
| 3,253,457 | 5/1966 | Pakala et al. | 73/587 |
| 3,289,465 | 12/1966 | Parker | 73/40.5 A |
| 3,500,676 | 3/1970 | Palmer | 73/40.5 A |
| 4,309,576 | 1/1982 | Corrigan | 73/40.5 A |

Primary Examiner—Stewart J. Levy
Assistant Examiner—John E. Chapman, Jr.
Attorney, Agent, or Firm—Mills and Coats

[57] ABSTRACT

This invention is a fluorescent light testing device. It is difficult to determine which fluorescent light or lights may be weak or on the verge of failing when a plurality of lights are disposed in the same general area. This is particularly true when the lights are of the overhead type and the higher the ceiling, the greater the problem. The present invention is a listening device on an extended boom type member to allow the user therof to readily determine which fluorescent lamp is humming thus indicating weakness or imminent failure so that the same can be replaced both to reduce energy use and to keep the lighting system at peak performance.

14 Claims, 6 Drawing Figures

TESTING DEVICE

FIELD OF INVENTION

This invention relates to testing means and more particularly to fluorescent light testers.

BACKGROUND OF INVENTION

Although various testing means have been developed to determine the strength of fluorescent lights and/or the starters associated therewith, the majority of these devices have been either for checking the equipment at the factory before shipment or for testing the same at the retail outlet prior to sale. A few devices have been developed for testing lamps or the combination of lamps and starters in the field but invariably these have required the lamps to be removed from their sockets or the test device to at least be in some way connected into the electrical system of the light.

Whenever large numbers of fluorescent lights are being maintained, it is impractical to check each light on an individual basis as required by the testers presently available and thus the lights usually are allowed to hum or burn out. Once a large enough group of the lights have given trouble, then it is worthwhile to go back and replace them all at once. This procedure is not only costly in wasted energy but also greatly reduces the peak lumen output of the system.

BRIEF DESCRIPTION OF INVENTION

After much research and study into the above-mentioned problems, the present invention has been developed to provide a means for testing fluorescent lights and their respective starters without removing the same from their sockets nor connecting into the electrical system thereof. This is accomplished through the use of a boom-like member to reach remote lights. A relatively sensitive microphone is mounted on the end of the boom with an amplifier operatively connected thereto with earphones being provided to give better sensitivity to the listening device and to block out disruptive ambient noises.

By placing the tester of the present invention adjacent a fluorescent type light, it can be readily determined if the same is weak or in imminent proximity to failure due to the humming noise emitted therefrom under such circumstances.

Once a weak light has been detected among the multiple lights usually found in such installations, the same can be replaced or repaired and thus top lighting efficiency is maintained with a minimum of effort in seeking out weak units.

In view of the above, it is an object of the present invention to provide a means for readily locating weak but still operative fluorescent lights.

Another object of the present invention is to provide a fluorescent light testing means which can readily isolate weak fluorescent lights remotely from the electrical circuits used to energize the same.

Another object of the present invention is to provide a highly efficient and yet relatively inexpensive means for testing fluorescent lights for signs of weakness.

Another object of the present invention is to provide a means for testing remotely mounted fluorescent lights with a minimum of time and effort.

Other objects and advantages of the present invention will become apparent from a study of the following description and the accompanying drawings which are merely illustrative of such invention.

DETAILED DESCRIPTION OF INVENTION

Figure 1:
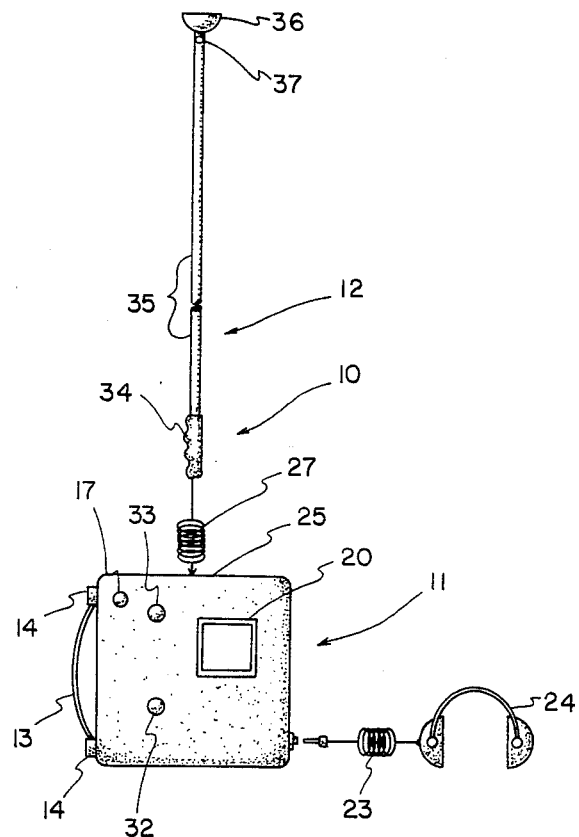
FIG. 1 is a front elevational view of the testing device of the present invention.
Figure 2:
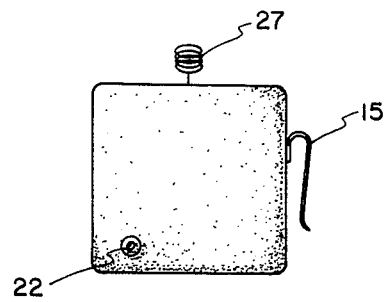
FIG. 2 is a side elevational view of the modular housing associated, therewith.
Figure 3:
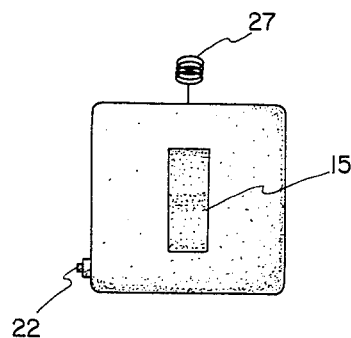
FIGS. 3 and 4 are respectively back and front elevational views of the modular housing.
Figure 4:
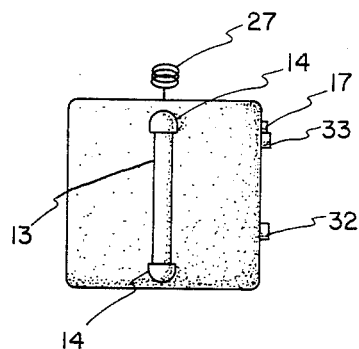
Figure 5:
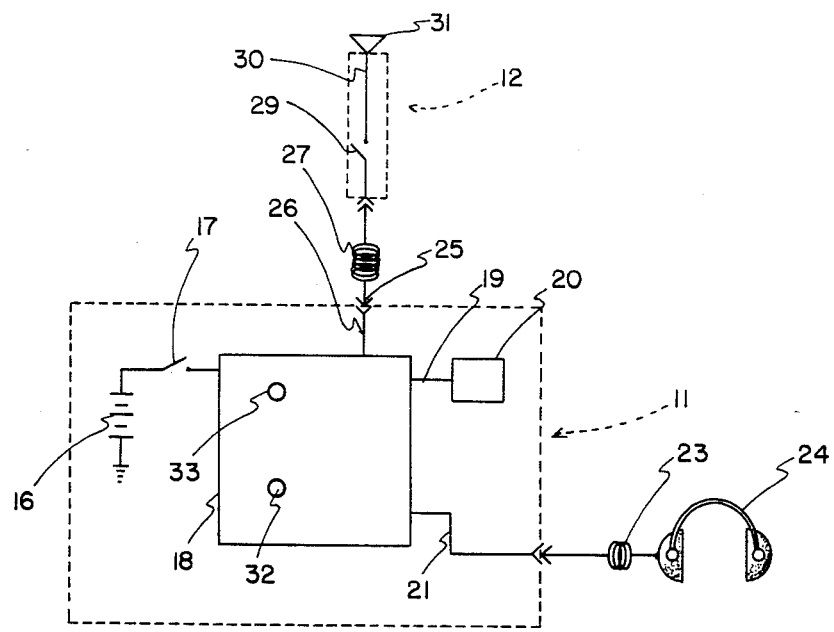
FIG. 5 is a schematic view of the testing device of the present invention.
Figure 6:
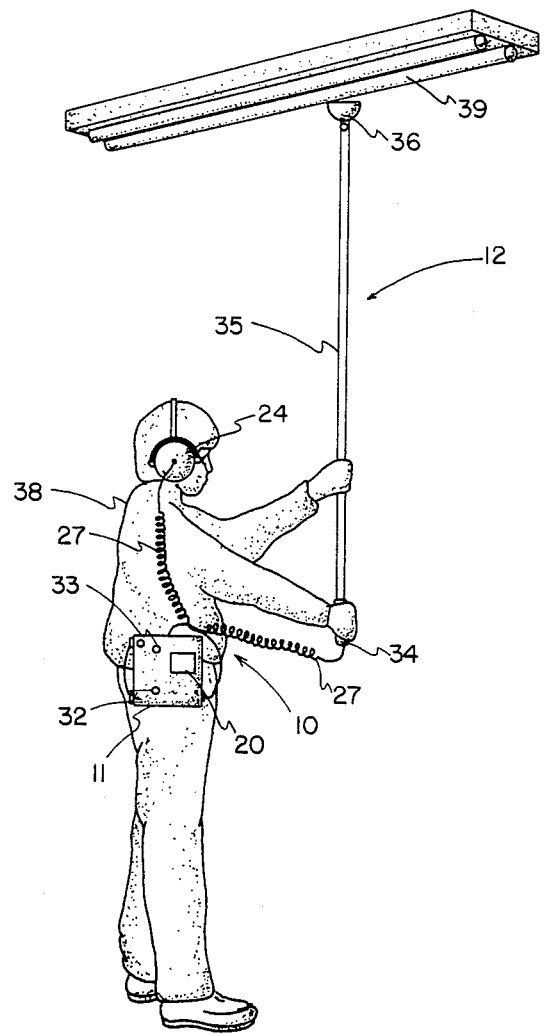
FIG. 6 is a perspective view of a person using the device of the present invention.

The testing device of the present invention, indicated generally at 10, includes a generally box-shaped housing, indicated generally at 11, and a hand-held boom-like probe member, indicated generally at 12.

The housing 11 includes a handle 13 on one side thereof which is connected to said housing by bosters 14 in the normal manner of such devices.

The rear of housing 11 includes a hook-like clip 15 formed from a spring-like material having a memory such as plastic or steel. This clip is adapted to mount housing 11 on the belt or clothing of the user 16 thereof. Since clips of this type are well known to those skilled in the art, further detailed description of the same is not deemed necessary.

Interiorly of housing 11 is a battery 16 which, through off-on switch 17, powers amplifier 18. On the output side of amplifier 18 and connected thereto by line 19 is a visible read-out 20 such as an LED vu bar graph display or a vu meter. Since both LED vu bar graph displays and vu meters are well known to those skilled in the art, further detailed discussion of the function of this portion of the present invention is not deemed necessary.

A second output from amplifier 18 is through line 21 which, by way of plug 22 and extensible coil cord 23, is connected to headphones 24.

A jack 25 is also provided on one end of input line 26 of amplifier 18. This last mentioned jack is used to connect coil cord 27 to jack 28 of probe 12. Mounted interiorly of this probe is a switch 29 in input line 30 which is operatively connected to microphone 31 which is preferably of the low to medium impedence type.

Switch 29 is used to turn the unit off when moving between monitoring locations. Although not specifically shown, it is to be understood that a remote switch of this type could be used to by-pass on-off switch 17 to accomplish basically the same function. In any case, switch 29 is operable with the hand holding probe 12 and can be of the spring loaded to open position if desired. Since switches of this type are well known to those skilled in the art, further detailed discussion of the same is not deemed necessary.

A volume control 32 is provided for amplifier 18 to control the volume of the headphones and/or a separate speaker (not shown) used in conjunction with or as a substitute therefor.

Also a gain control 33 is provided on amplifier 18 for eliminating background noises picked up by microphone 31. Again, since controls of this type are well known to those skilled in the art, further detailed discussion of the same is not deemed necessary.

The boom-like probe 12 includes an insulated hand grip 34 mounted on one end of an extensible/retractable arm 35. This member is preferably formed from telescoping, tubular type material. Although this material could be made from aluminum for lightness in weight, for safety at least a portion of the same should be made from a non-conductive plastic type material.

The microphone 31 is preferably mounted within a cup shaped member 36 formed from rubber or other suitable plyable material. This cup shaped member is pivotably mounted on the end of arm member 35 opposite hand grip 34 by means such as pivot pin 37. The purpose of this pivot joint between arm 35 and cup 36 is to allow the microphone 31 to be placed against the appropriate portion of fluorescent light fixture 39 to determine if a telltale humming noise is present. Since not only fluorescent tubes but also the starters and other components of the light need to be checked which, on various models, are disposed in different orientations, the pivoting microphone cup is advantageous in both allowing for more direct approach to the component being tested and also it shields ambient noises so that more accurate hum noise detection can be accomplished.

To use the testing device of the present invention, the box-like housing 11 can be picked up by handle 13 and moved to the test area where it is then clipped or otherwise secured to the belt or other portion of the clothing of the user 38 thereof. The headphones 24 are then placed over the ears of said user and the probe 12 is picked up by hand grip 34. The on-off switch 17 is then turned on and the volume control 32 and the gain control 33 adjusted as desired.

Next the microphone 31 within resilient cup 36 on the end of arm member 35 is placed adjacent an appropriate part of the fluorescent light fixture 39 to be tested. If an unusual hum is detected indicating a weak or burning out element, then this can be noted and as soon as the remaining components or fixtures have been checked, then the bad part can be replaced in the normal manner.

If a person is hard of hearing or otherwise does not wish to use headphones 24, then the visual display 20 can be watched for telltale indications of a bad component or unit.

In addition to the above audible and/or visual checking of components, the present invention can also be used to isolate which component is humming when the hum can be heard at some distance away. In instances of this type, the hum is quite often annoying to people working or studying nearby and yet it is difficult to isolate for repair wherein the use of the present invention will quickly remedy the problem by locating the bad part.

In classrooms, shops, aircraft hangars, and any number of other high ceiling, mass unit installations, the present invention allows the system to be quickly checked out to make sure that it is operating at peak lumen performance and if not, to allow the weak components of the system to be replaced before complete breakdown occurs.

From the above it can be seen that the present invention has the advantage of providing a simple to operate and yet highly efficient testing device for locating weak or defective components of lighting systems, particularly of the fluorescent type. The present invention also can be readily stored in a relatively small space when not in use and yet is study in construction.

The present invention can, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A testing device comprising: an elongated probe; a handle mounted on one end of said probe; an audible frequency pick-up mounted on the end of said probe opposite said handle for picking up sounds generated by a defective element of a fluorescent light fixture; a housing structure; an amplifier mounted within said housing structure; means for operatively connecting said pick-up to said amplifier; and signal means operatively connected to said amplifier for signaling to a user when there is a defective element.

2. The testing device of claim 1 wherein said audible frequency pick-up is a microphone.

3. The testing device of claim 2 wherein said microphone is of the low impedance type.

4. The testing device of claim 2 wherein said microphone is of the medium impedance type.

5. The testing device of claim 1 wherein the means operatively connecting said pick-up to said amplifier is a line extending from the end of said probe opposite said handle through said housing structure to said amplifier.

6. The testing device of claim 1 wherein said signaling means is of the visual type.

7. The testing device of claim 6 wherein said visual signaling means is a LED vu bar graph type display.

8. The testing device of claim 6 wherein said visual signaling means is a vu meter.

9. The testing device of claim 1 wherein said signaling means is of the audible type.

10. The testing device of claim 9 wherein the audible signaling means is a headphone.

11. The testing device of claim 9 wherein said audible signaling means is a speaker.

12. A method for detecting when an element of a fluorescent light fixture is defective comprising: placing an audible frequency pick-up on one end of an elongaged probe; placing a handle on the end of the elongate probe opposite said pick-up; connecting said audible frequency pick-up to an amplifier; connecting a signaling means to said amplifier; and manually positioning said pick-up adjacent a light fixture to be tested whereby sound generated by a defective element will register with said pick-up and thereby be signaled to a user.

13. The method of claim 12 whereby said signaling means is of the audible type.

14. The method of claim 12 whereby said signaling means is of the visual type.

* * * * *